United States Patent
Linnhoff et al.

(10) Patent No.: US 9,771,298 B2
(45) Date of Patent: Sep. 26, 2017

(54) APPARATUS AND METHOD FOR PRODUCING A RELIABLE BREAKING LINE FOR THE INDUSTRIAL CUTTING TO LENGTH OF GLASS SHEETS

(71) Applicant: Grenzebach Maschinenbau GmbH, Asbach-Baeumenheim (DE)

(72) Inventors: Winhold Linnhoff, Potsdam (DE); Klaus Schönheits, Blindheim (DE); Michael Müller, Donauwoerth (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 0 days.

(21) Appl. No.: 14/649,851

(22) PCT Filed: Dec. 2, 2013

(86) PCT No.: PCT/DE2013/000718
§ 371 (c)(1),
(2) Date: Jun. 4, 2015

(87) PCT Pub. No.: WO2014/094704
PCT Pub. Date: Jun. 26, 2014

(65) Prior Publication Data
US 2016/0214883 A1     Jul. 28, 2016

(30) Foreign Application Priority Data
Dec. 20, 2012   (DE) .................. 10 2012 025 091

(51) Int. Cl.
*C03B 33/033*   (2006.01)
*C03B 33/027*   (2006.01)
(Continued)

(52) U.S. Cl.
CPC ............ *C03B 33/033* (2013.01); *C03B 18/02* (2013.01); *C03B 33/027* (2013.01); *C03B 33/037* (2013.01); *C03B 33/10* (2013.01)

(58) Field of Classification Search
CPC ................................. C03B 33/033
See application file for complete search history.

(56) References Cited

U.S. PATENT DOCUMENTS

| | | | | |
|---|---|---|---|---|
| 3,506,172 A | * | 4/1970 | Wehr | C03B 33/027 225/96.5 |
| 4,049,167 A | * | 9/1977 | Guissard | C03B 33/027 225/103 |

(Continued)

FOREIGN PATENT DOCUMENTS

| | | |
|---|---|---|
| DE | 10 2004 025 329 | 12/2008 |
| EP | 0370973 | 5/1990 |

(Continued)

*Primary Examiner* — Cynthia Szewczyk
(74) *Attorney, Agent, or Firm* — Duane Morris LLP; J. Rodman Steele, Jr.; Gregory M. Lefkowitz

(57) ABSTRACT

Apparatus and method for producing a reliable breaking line for the industrial cutting to length of glass sheets by means of a cutting wheel running on a float glass line under pressure imposed from above, with the following features: a) the location of the beginning of a breaking line is determined and a cutting wheel holder (20) with a cutting wheel (2) is brought into position, b) the cutting wheel holder (20) is lowered and the cutting wheel (2) is lowered onto the glass sheet (1) concerned with the desired pressing pressure, wherein the pressing pressure is set by means of a swing arm (3) and is monitored by means of a strain gauge (4) secured thereto, c) a change in the height of the glass sheet (1) prompts a control signal for an actuating motor (12) to be derived from the change in the resistance of the strain (Continued)

Figure 1:
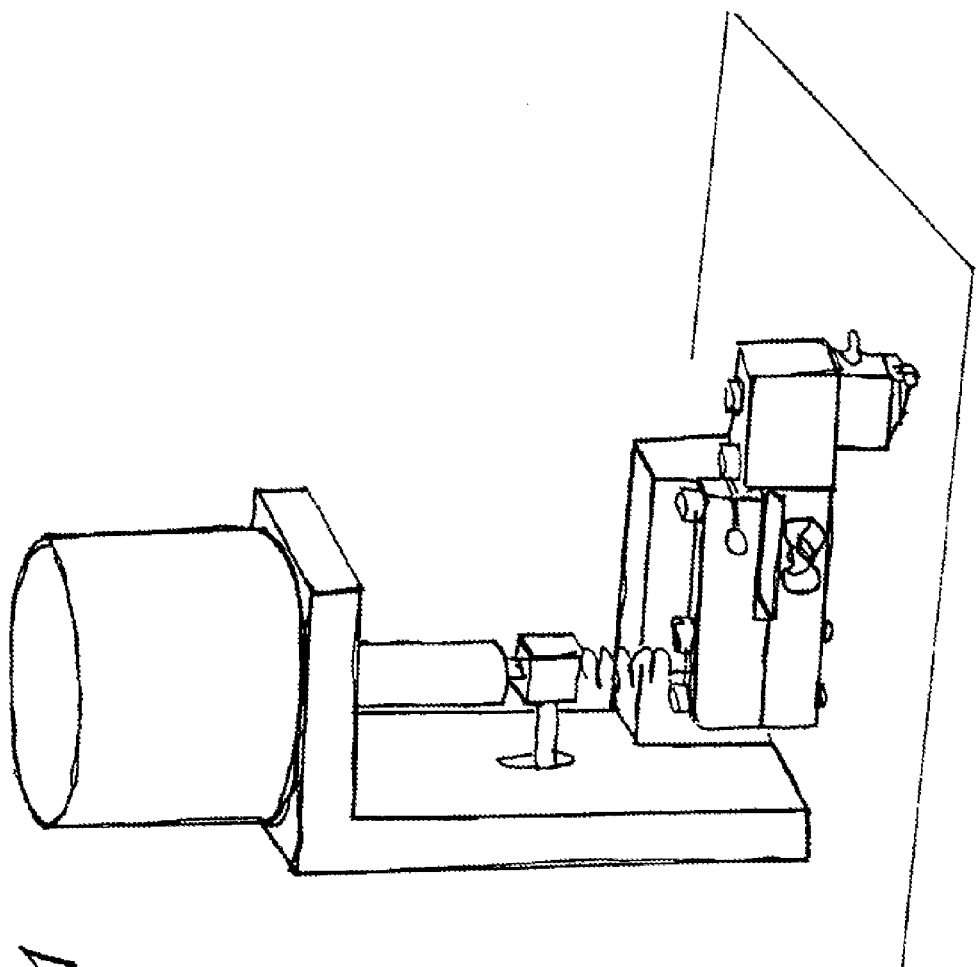

gauge (4), and the actuating motor brings about a corresponding change in the pressing pressure of the cutting wheel (2).

4 Claims, 4 Drawing Sheets

(51) Int. Cl.
    *C03B 33/037* (2006.01)
    *C03B 33/10* (2006.01)
    *C03B 18/02* (2006.01)

(56) References Cited

U.S. PATENT DOCUMENTS

| | | | |
|---|---|---|---|
| 4,220,066 A | 9/1980 | Hargreaves et al. | |
| 4,604,934 A * | 8/1986 | Elliott | C03B 33/027 83/425.4 |
| 5,168,788 A * | 12/1992 | Kozyrski | B26D 3/085 225/96.5 |
| 8,844,420 B2 | 9/2014 | Bando | |
| 8,939,337 B2 | 1/2015 | Roell | |
| 2005/0000304 A1 | 1/2005 | Smith | |
| 2005/0056127 A1* | 3/2005 | Yamabuchi | C03B 33/07 83/13 |
| 2006/0255083 A1 | 11/2006 | Bonaddio et al. | |
| 2010/0242702 A1 | 9/2010 | Tanise et al. | |
| 2014/0013802 A1* | 1/2014 | Niewiera | C03B 33/0235 65/29.11 |

FOREIGN PATENT DOCUMENTS

| | | |
|---|---|---|
| EP | 0837042 | 4/1998 |
| JP | 08283032 | 10/1996 |
| JP | 200106541 | 4/2001 |
| JP | 2007500361 | 1/2007 |
| JP | 2009-107897 | 5/2009 |
| JP | 2012-116197 | 6/2012 |

* cited by examiner

APPARATUS AND METHOD FOR PRODUCING A RELIABLE BREAKING LINE FOR THE INDUSTRIAL CUTTING TO LENGTH OF GLASS SHEETS

CROSS-REFERENCE TO RELATED APPLICATIONS

This application is a §371 national stage entry of International Application No. PCT/DE2013/000718, filed Dec. 2, 2013, which claims priority to German Patent Application No. 10 2012 025 091.6 filed Dec. 20, 2012, the entire contents of which are incorporated herein by reference.

The invention relates to a method and a device for producing a reliable breaking line for the industrial cutting to length of glass sheets.

With regard to the subject of cutting glass sheets to length, a method for low-waste cutting to length of blanks for automobile glass sheets or other glass sheets on a float glass production line is known from the prior art, for example, from DE 10 2004 025 329 B4.

An object of this patent specification is, with a method for cutting to length automobile sheets which has been carried out for many decades, to reduce the considerable amount of waste and to enable economical production of automobile glass sheets.

In order to solve this problem, according to claim 1 a method for cutting blanks involving little waste for automobile glass sheets or other glass sheets which substantially have a symmetrical or asymmetrical trapezoidal shape is protected. In this instance, the trapezoidal glass plates are cut directly on a float glass production line from the advanced float glass strip and the cutting pattern is selected in such a manner that two glass plates which are orientated so as to be rotated through 180° relative to each other are arranged with a corresponding inclined edge directly adjacent to each other and with the parallel trapezoidal edges thereof in alignment with each other in the form of a strip on the float glass strip. It is further claimed that, in the direction of the float glass strip, sequential glass plate pair strips are directly adjacent to each other, with the oblique trapezoidal edges which extend in an inclined manner with respect to the glass strip axis further being cut by means of correspondingly guided longitudinal cutting members and the parallel trapezoidal edges which form the strip edges being cut by means of transverse cutting members.

However, this does not involve cutting operations with rapidly moving float glass cutting blanks.

DE 10 2009 023 602 B4 describes a device for industrial production of resiliently deformable large-surface glass plates in high batch numbers.

An object of this device is to provide a device for separating resiliently deformable large-format glass plates by means of laser beams which is relatively inexpensive, which can be used on an industrial scale and which is not susceptible to failure.

As a solution to this object, in claim 1 a device having the following features is claimed:

a) a device for supplying a glass plate (3), the position of the front edge thereof being detected and being fixed in the desired position, b) a device for applying an initial scoring to the upper side of the glass plate (3) in the region of the desired breaking line, c) a device for locally limited heating of the glass surface with a laser beam which moves in a fan-shaped manner so as to oscillate on a straight line, the laser beam being guided in a tubular laser beam guide (10) and an adjacent redirection device (11) into a laser head (5) and the entire path over which the laser beam is guided comprising a space in which a slight excess pressure prevails with respect to the environment, d) a device for cooling the glass surface, there being arranged at least at one side of the laser beam at least one cooling nozzle (19) which can be operated intermittently and which can be controlled in terms of intensity and which conveys a fluid which can be changed in terms of temperature and conveying quantity, and the cooling medium, being applied at an air pressure of from 5 to 10 bar, e) a device for transporting a thermally locally pre-processed glass plate into the region of a device for breaking the glass plate, f) a device for detecting a linear crack formation on the surface of a glass plate (3), wherein a device for acting on the glass surface preferably comprises with a fluid condensate, for example, water vapor, wherein the technical control detection of the crack formation is carried out by means of an illumination device together with a camera system, g) a linear breaking blade at the lower side of the glass plate, which blade can be raised at one side and/or at both sides, shorter plate pieces in which the gravitational force or the inherent weight thereof is not sufficient for breakage, being held down by means of at least one holding-down member (27) which can be displaced in a motorized manner.

However, high speeds when the crack is formed, as required for the separation of float glass, cannot be achieved with this method.

A device for scoring glass comprising a cutting device, which carries a cutting tool and a device which is connected to the cutting device for transmitting a cutting load to the cutting device is described in DE 28 34 672 C2.

With this device, the reaction forces acting counter to the cutting load when the cutting tool is placed on the glass surface are intended, to be damped. It is intended in particular to be prevented that, when the cutting tool is placed on the glass face, at a high cutting speed, a temporary significant reduction of the load force occurs as a result of the reaction force and under some circumstances brings about a springing-back of the cutting tool from the glass face.

This object is achieved here with a block of resilient material which absorbs a portion of the energy which is produced by means of the reaction forces acting counter to the cutting load when the cutting tool is brought into contact with the glass face, the resilient block having a loss factor of Tangent Delta=A2/A1, which is greater than 0.2 in order to prevent temporary significant reduction of the cutting load, A1 being a resilient load component which changes in phase with the load, and A2 being a viscous load component which extends with a phase displacement of 90° with respect to the load.

An object of the invention is to provide a novel cutting device for glass plates in float glass production, which device ensures reliable positioning of the cutting tool on the glass plate and an operation which is free from dropouts, wherein absolute insensitivity with respect to glass dust is ensured.

This object is achieved with the features of embodiment 1, A device for producing a reliable breaking line for the industrial cutting to length of glass sheets by means of a cutting wheel which moves under load pressure on a float glass line, having the following features:

a) a base console (11) which has a rotation axis (19) at the lower side and in which there is rotatably supported a rotation head (5) which operates at one side and which is connected at the operating side by means of a resilient element (17) and a horizontally fixedly supported but vertically movably supported connection element (16) to a threaded spindle (15) which can move vertically in a connection sleeve (14), b) a servo motor (12) at the upper side of the base console (11) having a motor shaft (13) which is securely connected to the connection sleeve (14), c) a rocker bar retention member (6) which is constructed in a bar-like manner and which is connected at one side to the operating side of the rotation head (5) by means of connections (8) and which carries at the other opposite side a cutting wheel retention member (20) having a cutting wheel (2), d) a rocker bar (3) in the form of a zone which is weakened in a selective manner by means of 4 large cylindrical holes and a small cylindrical hole between them in the central region of the rocker bar retention member (6), wherein these holes constitute in the side view circles having a large radius (22) and a circle having a small radius (21) and these holes merge seamlessly into each other in the longitudinal axes thereof, e) an expansion measurement strip (4) at the upper side of the rocker bar (3) in order to detect the oscillations thereof, an electronic measurement system (21) relating thereto and a data cable (26) for controlling (27) the servo motor (12).

Embodiment 2:

The device as set forth in embodiment 1,
characterized in that
two large cylindrical holes intersect in the rocker bar (3), wherein the associated circles form a vesica piscis in the plane of section and in that the spacing of the center point of the small circle from the center points of the two pairs of large circles is equal to double the radius 23 of the small circle, and in that the radius 23 behaves with respect to the radius 22 as 1 does to 1.55.

Embodiment 3:

The device as set forth in embodiment 1 or embodiment 2,
characterized in that
a plurality of devices are arranged in a turret-like manner in the manner of a tool changing head (24).

Embodiment 4:

The device as set forth in embodiment 1, 2 or 3,
characterized in that,
by means of a sensor which is not described in greater detail, the height position of the glass sheet 1 which is located directly upstream of the cutting operation is detected and any changes in a positive or negative direction are used to correct and/or determine the control signals of the servo motor (12).

and a corresponding method set forth in embodiment 5:

A method for producing a reliable breaking line for the industrial cutting to length of glass sheets by means of a cutting wheel which moves under load pressure on a float glass line, having the following features:

a) the location of the beginning of a breaking line is determined and a cutting wheel retention member (20) having a cutting wheel (2) is moved into position, b) the cutting wheel retention member (20) is lowered and the cutting wheel (2) is lowered with the desired pressing force onto the relevant glass sheet (1), wherein the glass sheet is either already moving under the cutting wheel (2) or begins to move only after the positioning operation, wherein the pressing force is adjusted by means of a rocker bar (3) and is monitored by means of an expansion measurement strip (4) which is secured thereto, c) when the height position of the glass sheet (1) changes, there is derived from the change of the resistance value of the expansion measurement strip (4) a control signal for a servo motor (12) which, by means of a lifting installation in the form of a rocker bar retention member (6), brings about a corresponding change of the pressing force of the cutting wheel (2).

Embodiment 6:

The method as set forth in embodiment 5:
characterized in that,
by means of the measurement data of the expansion measurement strip (4), a rapid establishment of the glass thickness is enabled and in that the process data can thereby be established for a rapid placement of the cutting wheel (2) and an optimized pressing force.

Embodiment 7:

The method as set forth in embodiment 6:
characterized in that
as a provision, a plurality of devices are arranged in a turret-like manner in the manner of a tool change head (24), Embodiment 8:

The method as set forth in embodiments 5, 6 or 7:
characterized in that
by means of a sensor which is not described in greater detail, the height position of the glass sheet 1 which is located directly upstream, of the cutting operation is detected and any changes in a positive or negative direction are used to correct and/or determine the control signals of the servo motor (12).

Embodiment 9:

A computer program having a program code for carrying out the method steps as claimed in one of embodiments 5 to 8 when the program is carried out on a computer.

Embodiment 10:

A machine-readable carrier having the program code of a computer program, for carrying out the method as claimed in one of embodiments 5 to 8 when the program is carried out on a computer.

Figure 2:
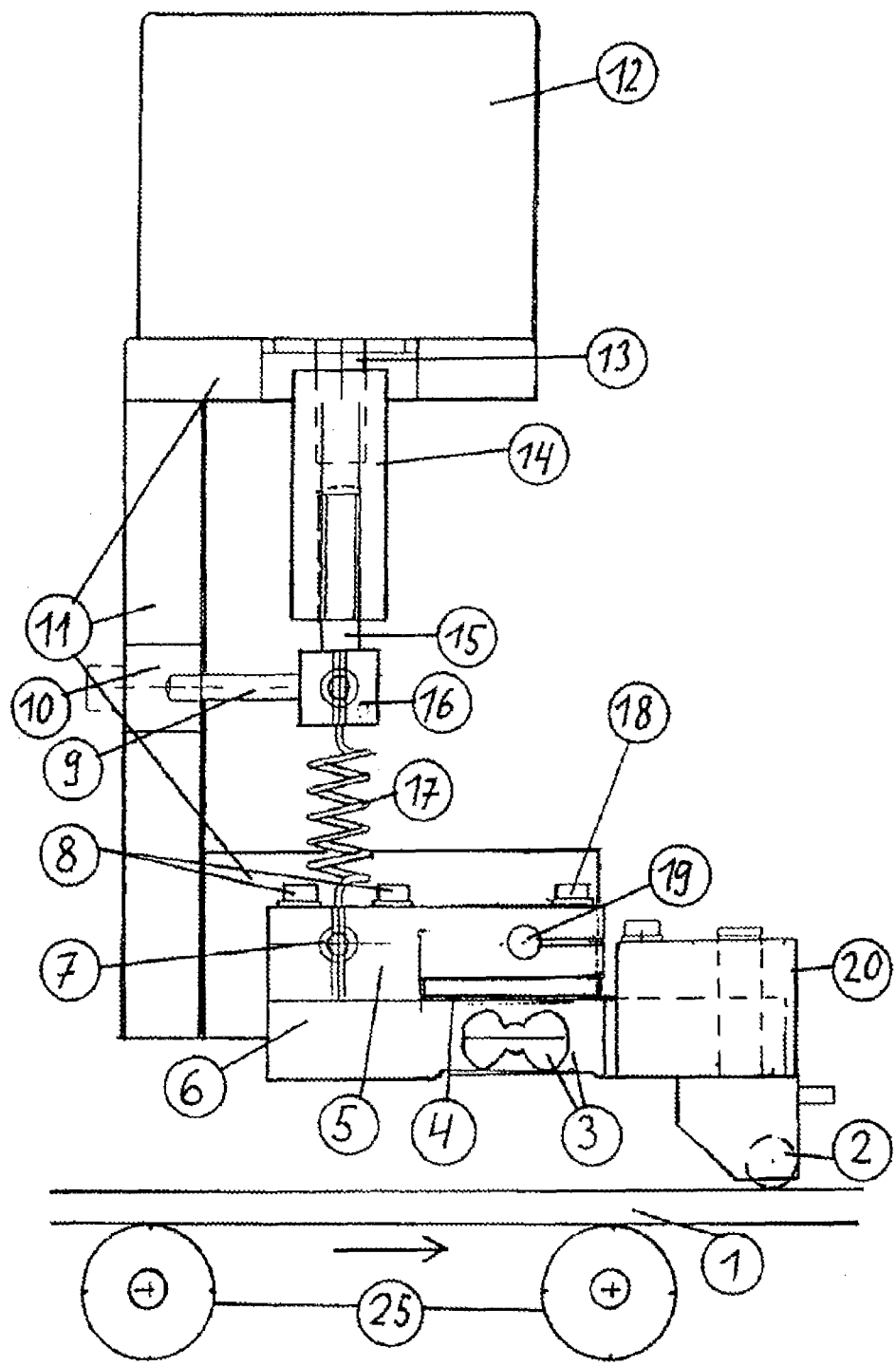
Figure 3:
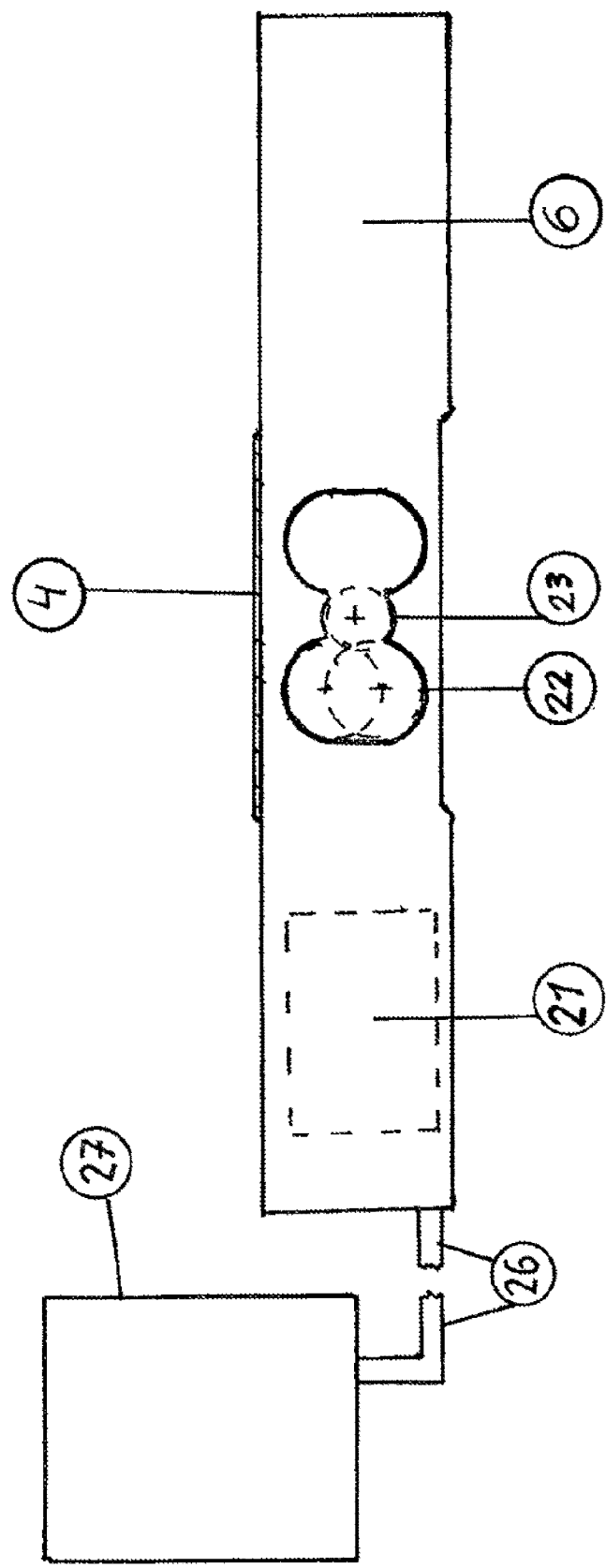
Figure 4:
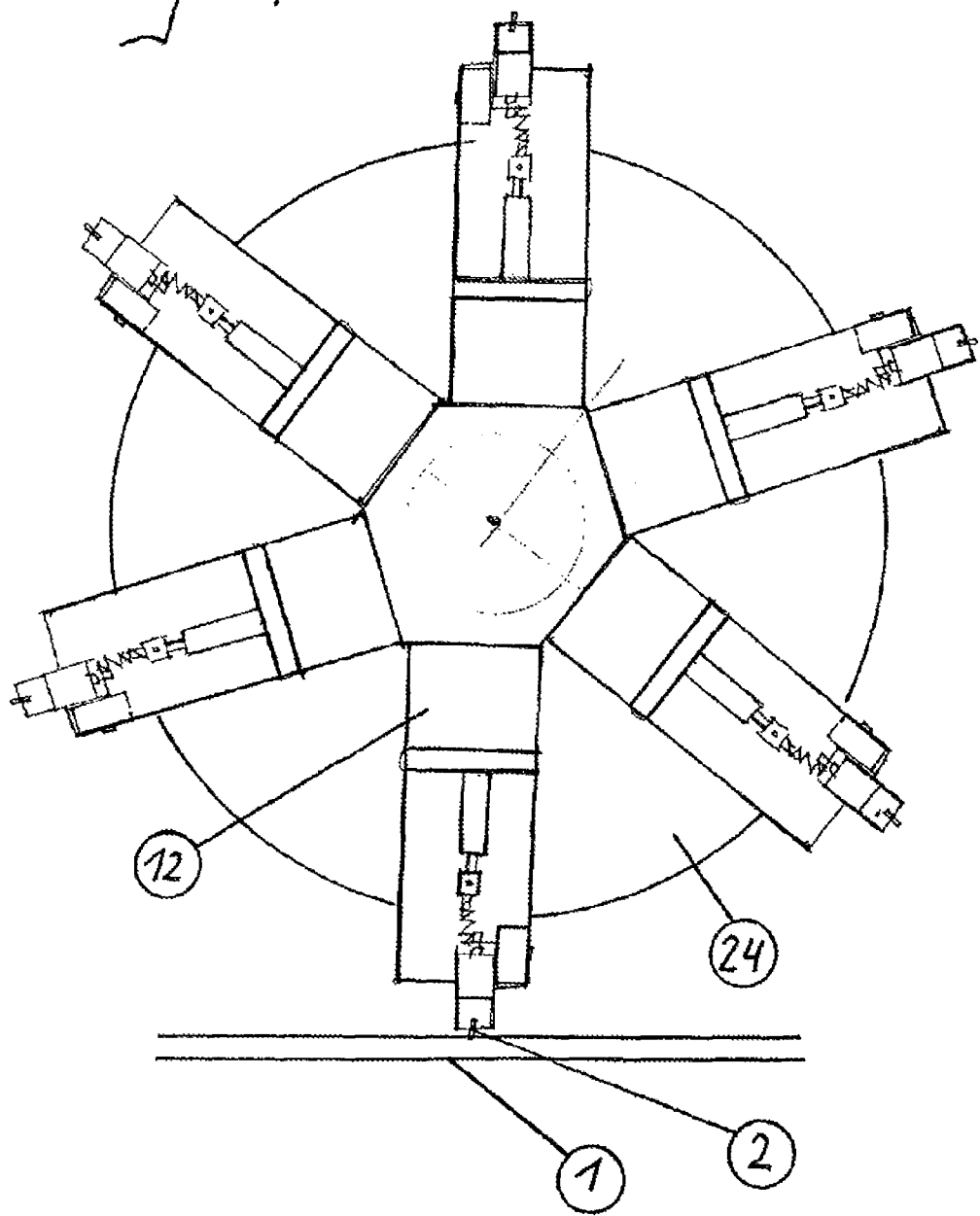

The invention is described in greater detail below with reference to the Figures, in which:

FIG. 1: is a perspective illustration of the entire device,

FIG. 2: is a sectioned drawing through the entire device,

FIG. 3: is a sectioned, drawing through the rocker bar retention member 6,

FIG. 4: is a sectioned drawing through a tool change head according to the invention.

FIG. 1 is a perspective illustration of the entire device. In this instance, in the horizontal bearing, it is possible to see a glass sheet which is intended to be cut and by means of which a cylindrical servo motor is supported on an L-shaped carrier arm. At the base of this carrier arm, there is secured a bearing block which enables the support of the actual cutting device. The additional retention member of the carrier arm and the connection thereof to other machine components are not illustrated here.

In FIG. 2, details of the perspective illustration of FIG. 1 can be seen by means of a sectioned drawing.

Above a glass sheet 1 which moves on transport rollers 25, it is possible to see in the free position a base console 11 which substantially corresponds to the L-shaped carrier arm and the bearing block from FIG. 1. There is supported, on the base console 11 a servo motor 12, to the motor shaft 13 of which a connection sleeve 14 having an inner thread is securely connected. In the inner thread of the connection sleeve 14, there is screwed a threaded spindle 15 which is connected to a connection element 16 which has a guiding pin 9. The guiding pin 9 is supported, in a guiding slot 10 of the base console 11 in an almost play-free manner. This illustration shows that the connection element 16 can be vertically adjusted in a stepless manner by means of a rotation of the motor shaft 13.

In the bearing block of the base console 11 mentioned in FIG. 1, there is introduced in a horizontal position a rotation axis 19 to which a rotation head 5 is secured by means of a clamping screw 18. This rotation knob 5 is connected by means of a resilient securing member 7 via a resilient element 17 to the connection element 16.

At the lower side of the rotation head 5, there is secured by means of two screw connections 8 a rocker bar retention member 6, at the opposite side of which there is arranged a cutting wheel retention member 20 which in turn carries the cutting wheel 2. The rocker bar retention member 6 has in the central region a zone which is referred to as a rocker bar 3 and which substantially comprises an arrangement of cylindrical recesses which engage one inside the other and which reduce this zone in terms of cross section and consequently enable the receiving of bending torques. This results in almost the entire rocker bar retention member 6 resiliently giving way with respect to impacts which act from the region of the cutting wheel retention member 20, and acting as a rocker bar. The view through the recesses mentioned shows the lower edge of the base console 11. An expansion measurement strip 4 is secured to the upper side of the rocker bar 3 in order to receive the oscillations of the rocker bar 3.

In this manner, the vertical positional changes of the cutting wheel 2 detected by the expansion measurement strip 4 can be further processed and evaluated.

FIG. 3 is a sectioned drawing through the rocker bar retention member 6. The structural unit which is referred to as an entire component as a rocker bar retention member 6 has in the central portion thereof according to FIG. 2 a recess which is referred, to as a rocker bar 3 and which substantially comprises 5 individual cylindrical recesses which merge into each other in a specific arrangement, wherein the radii of the end faces of these cylinders are located in a specific relationship with respect to each other and are illustrated in FIG. 3 substantially as circles. The radius of a large circle is designated 22, the radius of the small circle 23.

These cylindrical recesses comprise four larger recesses of which two pairs of these recesses merge into each other and overlap in the manner of a vesica piscis (air bladder), and wherein both pairs are connected to each other by means of a smaller cylindrical recess.

The spacing of the distance from the center point of the small circle to the center point of a large circle corresponds to double the radius 23 of the small circle. The relationship of the radius of the small circle behaves with respect to the radius of a larger circle as 1 does to 1.55.

From the expansion measurement strip 4, an electrical connection leads to an associated electronic measurement system 21 and, from there, a data cable 26 leads to the control unit 27 which sends corresponding control signals in order to actuate the servo motor 12. In this manner, by changing the position of the connection element 16 in a vertical direction and corresponding rotation of the rocker bar retention member 6 via the helical spring 17, the pressure of the cutting wheel 2 on the glass sheet 1 rapidly changes and changing relationships are adapted.

This may, for example, be necessary when the transport rollers 25 travel in a bumpy manner and/or glass splinters are introduced between the glass sheet 1 and a transport roller 25. However, there may also be as a result of quite imperceptible thickness changes in the float glass sheet 1 which have to be compensated for in order to achieve a constant scoring depth.

Regardless of this, it is naturally possible to readily react to a change in thickness of the float glass strip which can be foreseen in the production process in terms of control technology.

It is thus possible using the device according to the invention to readily establish the glass thickness in the present case and to store and use it as a process parameter.

This involves the following operating sequence:
1. The cutting wheel 2 touches the glass sheet 1.
2. The expansion measurement strip 4 produces a signal which corresponds to the thickness of the glass sheet 1.
3. The established position of the cutting wheel 2 is stored in the system.
4. For each additional processing operation, the required, pressing force for the relevant glass sheet 1 can be calculated and adjusted.
5. The processes 1 to 4 consequently enable rapid approach of the cutting wheel 2 and also rapidly optimized and reliable introduction of the cutting wheel 2 into the respective glass sheet 1.

In the electronic measuring system 21, there are substantially a device for producing the supply voltage required for the actuation of the expansion measurement strip 4, an electric bridge circuit which is required to detect the resistance change of the expansion measurement strip 4 and an amplification circuit which is required to transmit the measurement signal. Since the operation of an expansion measurement strip is also dependent on the ambient temperature, there is also a temperature sensor in the region of the electronic measurement system 21.

There are various measurement methods for expansion measurement strips, from which the person skilled in the art can select the appropriate one in the present case. With the device described, it is possible by means of immediate reaction to react at high speed to changes which can influence the cutting result.

FIG. 4 is a sectioned drawing through a tool change head according to the invention.

In this instance, there is illustrated a device for rapidly changing tools with different sizes of cutting wheels 2 or different, equipment in terms of expansion measurement strips 4 or helical springs 17. It is thus possible, for example, to react quickly to changes in the thickness of the float glass plate to be cut.

In a specific embodiment, there may be provision, by means of a sensor which is not described in greater detail, for the height position of the glass sheet 1 which is located directly upstream of the cutting operation to be detected and any changes in the positive or negative direction to be used to correct and/or determine the control signals of the servo motor 12.

The control of the complex movement, operations and the signal processing of the sensors used require a specific control program.

LIST OF REFERENCE NUMERALS

1 Glass sheet
2 Cutting wheel

3 Rocker bar
4 Expansion measurement strip
5 Rotation head
6 Rocker bar retention member
7 Resilient securing member
8 Screw connection for the rocker bar
9 Guiding pin
10 Guiding slot
11 Base console
12 Servo motor
13 Motor shaft
14 Connection sleeve with inner thread
15 Threaded spindle
16 Connection element, for resilient adjustment
17 Resilient element
18 Clamping screw
19 Rotation axis
20 Cutting wheel retention member
21 Electronic measurement system for the expansion measurement strip and thermal sensor
22 Large radius of the aperture
23 Small radius of the aperture
24 Tool change head
25 Transport rollers
26 Data cable
27 Control unit (servo motor)

The invention claimed is:

1. A device for producing a reliable breaking line for the industrial cutting to length of glass sheets on a float glass line, the device comprising:
   a) a cutting wheel (2) that moves under load pressure on a float glass line;
   b) a base console (11) which has a rotation axis (19) at the lower side and in which there is rotatably supported a rotation head (5) which operates at one side and which is connected at the operating side by means of a resilient element (17) and a horizontally fixedly supported but vertically movably supported connection element (16) to a threaded spindle (15) which can move vertically in a connection sleeve (14),
   c) a servo motor (12) at the upper side of the base console (11) having a motor shaft (13) which is securely connected to the connection sleeve (14),
   d) a rocker bar retention member (6) which is constructed in a bar-like manner and which is connected at one side to the operating side of the rotation head (5) by means of connections (8) and which carries at the other opposite side a cutting wheel retention member (20) having the cutting wheel (2),
   e) a rocker bar (3) in the form of a zone which is weakened in a selective manner by means of 4 large cylindrical holes and a small cylindrical hole between them in the central region of the rocker bar retention member (6), wherein these holes constitute in the side view circles having a large radius (22) and a circle having a small radius (23) and these holes merge seamlessly into each other in the longitudinal axes thereof,
   f) an expansion measurement strip (4) at the upper side of the rocker bar (3) in order to detect the oscillations thereof, an electronic measurement system (21) relating thereto and a data cable (26) for controlling (27) the servo motor (12).

2. The device as claimed in claim 1, wherein two of the 4 large cylindrical holes intersect in the rocker bar (3) to form a vesica piscis in the plane of section;
   wherein the distance between the center point of the small cylindrical hole from the center points of the two large cylindrical holes is equal to double the radius (23) of the small cylindrical hole; and
   wherein the ratio between the radius (23) and the radius (22) is 1 to 1.55.

3. A device for producing a reliable breaking line for the industrial cutting to length of glass sheets on a float glass line, comprising a tool changing head (24) and a plurality of devices as claimed in claim 1, wherein the devices as claimed in claim 1 are arranged in a turret-like manner in the tool changing head (24).

4. The device as claimed in claim 1, further comprising a sensor that can detect the height position of the glass sheet 1 when the glass sheet 1 is located directly upstream of the cutting operation.

* * * * *